US012707119B2

(12) United States Patent
Nijim et al.

(10) Patent No.: US 12,707,119 B2
(45) Date of Patent: Aug. 11, 2026

(54) INGRESS DETECTION AND LOCALIZATION

(71) Applicant: Cox Communications, Inc., Atlanta, GA (US)

(72) Inventors: Yousef Wasef Nijim, Cumming, GA (US); Christopher James Topazi, Atlanta, GA (US); Mario Amato, Atlanta, GA (US); Jeff Robertson, Atlanta, GA (US); James Alan Strothmann, Johns Creek, GA (US)

(73) Assignee: Cox Communications, Inc., Atlanta, GA (US)

( * ) Notice: Subject to any disclaimer, the term of this patent is extended or adjusted under 35 U.S.C. 154(b) by 91 days.

(21) Appl. No.: 18/655,193

(22) Filed: May 3, 2024

(65) Prior Publication Data

US 2025/0343968 A1 Nov. 6, 2025

(51) Int. Cl.

*H04N 21/442* (2011.01)
*H04N 21/437* (2011.01)
*H04N 21/438* (2011.01)
*H04N 21/466* (2011.01)

(52) U.S. Cl.

CPC ......... *H04N 21/442* (2013.01); *H04N 21/437* (2013.01); *H04N 21/438* (2013.01); *H04N 21/4662* (2013.01)

(58) Field of Classification Search

CPC .. H04N 21/442; H04N 21/437; H04N 21/438; H04N 21/4662

See application file for complete search history.

(56) References Cited

U.S. PATENT DOCUMENTS 6,154,739 A * 11/2000 Wrobel ................. G06F 16/285 707/999.005
6,711,135 B1 3/2004 Dziekan et al.
10,284,928 B2 5/2019 Teflian
10,404,585 B1 9/2019 Bonen
10,963,333 B1 3/2021 Nijim et al.
11,336,575 B1 5/2022 Milley et al.

(Continued)

OTHER PUBLICATIONS

International Search Report and Written Opinion for Application No. PCT/US2025/026547 mailed Aug. 4, 2025.

*Primary Examiner* — Nicholas T Corbo
(74) *Attorney, Agent, or Firm* — Merchant & Gould P.C.

(57) ABSTRACT

A method, system, and computer readable storage device detect and localize ingress noise within a customer premises equipment network. Data associated with customer premises equipment activities within a customer premises equipment network is collected. A machine learning engine is trained how to detect ingress data being generated within customer premises equipment nodes of the customer premises equipment network. The machine learning engine then detects customer premises equipment nodes that are generating ingress noise data above a first predetermined level. The machine learning engine then identifies locations of ingress data generation within the detected nodes and further identifies those identified ingress data generation locations that are generating ingress data exceeding a second predetermined level. The method, system, and computer readable storage device can further reduce ingress data generation from the detected identified locations.

20 Claims, 6 Drawing Sheets

(56) References Cited

U.S. PATENT DOCUMENTS

| | | | | |
|---|---|---|---|---|
| 2013/0332399 | A1* | 12/2013 | Reddy | H04L 41/0631<br>706/12 |
| 2020/0274628 | A1* | 8/2020 | Towfiq | H04L 41/22 |
| 2022/0182254 | A1* | 6/2022 | Yates | H04N 7/17309 |

* cited by examiner

INGRESS DETECTION AND LOCALIZATION

BACKGROUND

Users of customer premises equipment (CPE) devices (e.g., cable or satellite television set-top box (STB), cable modem, digital subscriber line (DSL) or other broadband Internet router, voice over Internet protocol (VOIP) base station, telephone handset, streaming media player, or other customized hardware used by a particular telecommunications or media service provider) expect their devices to operate reliably. However, users may experience problem issues with their CPE devices due to a wide variety of reasons from hardware or software issues to loose connections. When a CPE device experiences an issue and is not functioning properly, the CPE device can operate inefficiently, can experience downtime, and/or services provided via the CPE device can be interrupted, slowed, or otherwise negatively affected. As can be appreciated, this can not only negatively impact resource productivity, but can also negatively affect quality of service, costs of operation and maintenance, and customer satisfaction.

Further, typically when CPE devices have problems, the devices may issue ingress noises that degrade performance and cause wide-ranging problems within the network with which the devices are connected. Trouble-shooting those problems to identify the devices causing the problems often result in identification of a large number of devices, such as one hundred devices or more, only one or a few of which may actually be causing the problems. Minimizing the number of possible problem-causing devices is time-consuming, expensive, and often fails to identify the particular device or finite devices that are actually causing the problem (s). Operational costs for the CPE devices is high as technicians are using labor-intensive processes and are visiting multiple sites to check the noise and attempt to fix the problem where it exists.

Users of the CPE devices, who are typically subscribers to the services provided to users through the CPE devices, often are not aware that their particular device may be causing problems within the CPE network. Often, these users may only detect that their services are slowed or some services are not available. In response, the user may contact or "call" the provider of the CPE device to resolve the issue. In some cases, a customer service agent, technical support person, or on-call "expert" may take the "call," obtain information from the user about the issue the user is experiencing with the CPE device, and may suggest various troubleshooting instructions to the user. In some cases, when an issue is detected or when a CPE device fails, a dispatch or "truck roll" is required to attempt to repair the device or to replace the device and restore service to the user. Not only can this be frustrating to the user, but the cost of truck rolls and the cost of replacing failed devices can be significant expenses for the provider. Often the source of the ingress noise is identifiable as only among hundreds of subscribers, which requires a tedious, time-consuming, and expensive inquiry into which particular subscriber(s) is/are generating the objectionable ingress noise.

Ingress and the amplification of noise upstream to the head end and downstream to the customer will become a larger problem as more devices are added to the network, yet increased devices within the network are often the result as networks are expanded and more customers come online. The technologies of these networks and devices may not change as the networks expand, but more problems in the operation of the technologies may increase as the networks expand, causing grief to both the manager of the network and the customers within the network. Changes are needed to be able to identify the sources of the problems in the network to be able to more effectively detect and localize the sources of the noise problem within the technologies at use in the network. These changes should reduce the operational cost of managing efficient and effective CPE networks and provide a better understanding of the ingress impact from the subscriber house to the CPE network, downstream speeds, and upstream speeds. Such improvements should improve customer/subscriber experience with the network service provider.

SUMMARY

Aspects of the present disclosure provide a technical improvement to the functionality and performance of customer premises equipment (CPE) devices connected to a network by providing device troubleshooting, detection, location, error reduction, and optimization. A method, system, and computer readable storage device are provided that collect data associated with the health of networked CPE devices, service provider data, and service and repair data associated with CPE devices, analyze the collected information, detect issues that can affect the functioning and operation of one or more CPE devices, and detect the poor performing devices. For example, aspects provide for evaluating the communal health of CPE devices, which can be used to identify issues, detect and localize issues, and predict issues, including excessive ingress noise within the system. Analysis of collected data can be configured according to insights derived from machine learning techniques applied to collected data, service provider data, and service and repair data of CPE devices.

According to certain embodiments, a method is provided for ingress detection and localization within a customer premises equipment network, the method including collecting data associated with customer premises equipment activities within a customer premises equipment network; detecting, with a machine learning engine, customer premises equipment nodes within the collected data that are generating ingress data above a first predetermined level; identifying locations of ingress data generation within the detected nodes; detecting, by the machine learning engine, identified ingress data generation locations generating ingress data exceeding a second predetermined level; and reducing ingress data generation from the detected identified locations.

Under a further embodiment, a system is provided for detecting and localizing ingress, the system including a processing device; a machine learning engine; and non-transitory computer readable data storage media storing instructions that, when executed by the processing device, cause the processing device to collect data associated with customer premises equipment activities within a customer premises network; detect, with a machine learning engine, customer premises equipment nodes within the collected data that are generating ingress data above a first predetermined level; identify locations of ingress data generation within the detected nodes; detect, by the machine learning engine, identified ingress generation locations generating ingress data exceeding a second predetermined level; and reduce ingress data generation from the detected identified locations.

According to additional embodiments, a non-transitory computer readable storage device including executable instructions is provided for ingress detection and localization within a customer premises equipment network, which when executed by a processor, is operable to collect data associated with customer premises equipment activities within a customer premises equipment network; detect, with a machine learning engine, customer premises equipment nodes within the collected data that are generating ingress data above a first predetermined level; identify locations of ingress data generation within the detected nodes; detect, by the machine learning engine, identified ingress generation locations generating ingress data exceeding a second predetermined level; and reduce ingress data generation from the detected identified locations.

In various implementations, the method, system, and computer readable storage device further provide for method and system for detecting network ingress and/or egress that includes receiving data associated with communications activities, and detecting nodes within the received data that are generating ingress and/or egress data above a first predetermined level, and identifying locations of ingress within the detected nodes. Once the locations of ingress and/or egress are identified within the detected nodes, locations generating ingress and/or egress exceeding a second predetermined level can be detected, and the ingress being generated from the detected identified locations can be reduced or localized. Within this invention, the process of reducing the amount of ingress or egress is similarly referenced as localizing, wherein the source of ingress or egress is localized.

The solutions to ingress noise identified in this disclosure will detect ingress noise at a house or subscriber level or, in a worst-case scenario, at much fewer houses than is currently possible with existing systems of identifying and resolving ingress noise within networks. These steps will save detection, localization, and repair costs and will be able to identify houses that are negatively affecting the network with noise coming from ingress issues. The performance of the CPE equipment devices will be significantly improved by the technology improvements disclosed herein by being able to detect and localize ingress noise generation at a house or near-house level as compared to current techniques of detecting such noise at a level of hundreds of houses.

A technical solution is needed to reduce the amount of ingress and/or egress being generated within a CPE network. A technical solution is also needed to reduce the amount of time required to identify the source of the ingress and/or egress. A technical solution is further needed to reduce the cost of reducing the amount of ingress and/or egress being generated within the CPE network. Each of these problems can be solved by the novel and unconventional techniques and devices disclosed herein. While not discussed in as great of detail in this document as is the detection and reduction/localization of ingress issues, embodiments disclosed in this document work well in the detection and reduction/localization of egress issues that migrate egress noise downstream from its origin in the CPE network.

By collecting and analyzing data in association with various CPE devices, insights can be derived for understanding issues, such as those issues that may cause or affect the generation of ingress within the CPE system. Accordingly, the quality, operation, and performance of the CPE devices and related services are improved. The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

The present invention has other features and advantages which will be apparent from or are set forth in more detail in the accompanying drawings, which are incorporated herein, and the following Detailed Description, which together serve to explain certain principles of the present invention and to enable a person of ordinary skill in the art to make and use the embodiments disclosed herein. In the drawings, like reference numbers indicate identical or functionally similar elements. Brief descriptions of the drawings are as follows.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes can be determined in part by persons of ordinary skill in the art for the particular intended application and use environments.

DETAILED DESCRIPTION

Aspects of the present disclosure enable an improvement of the performance of computing devices connected to a network of customer premises equipment (CPE) by providing technology improvements to devices of a CPE network 202 for detecting, localizing, reducing, and repair of ingress noise and egress noise generating connections and devices. The devices performing these technology improvement functions can be seen in FIG. 1 and FIG. 2 and will be discussed in further detail below.

Figure 2:
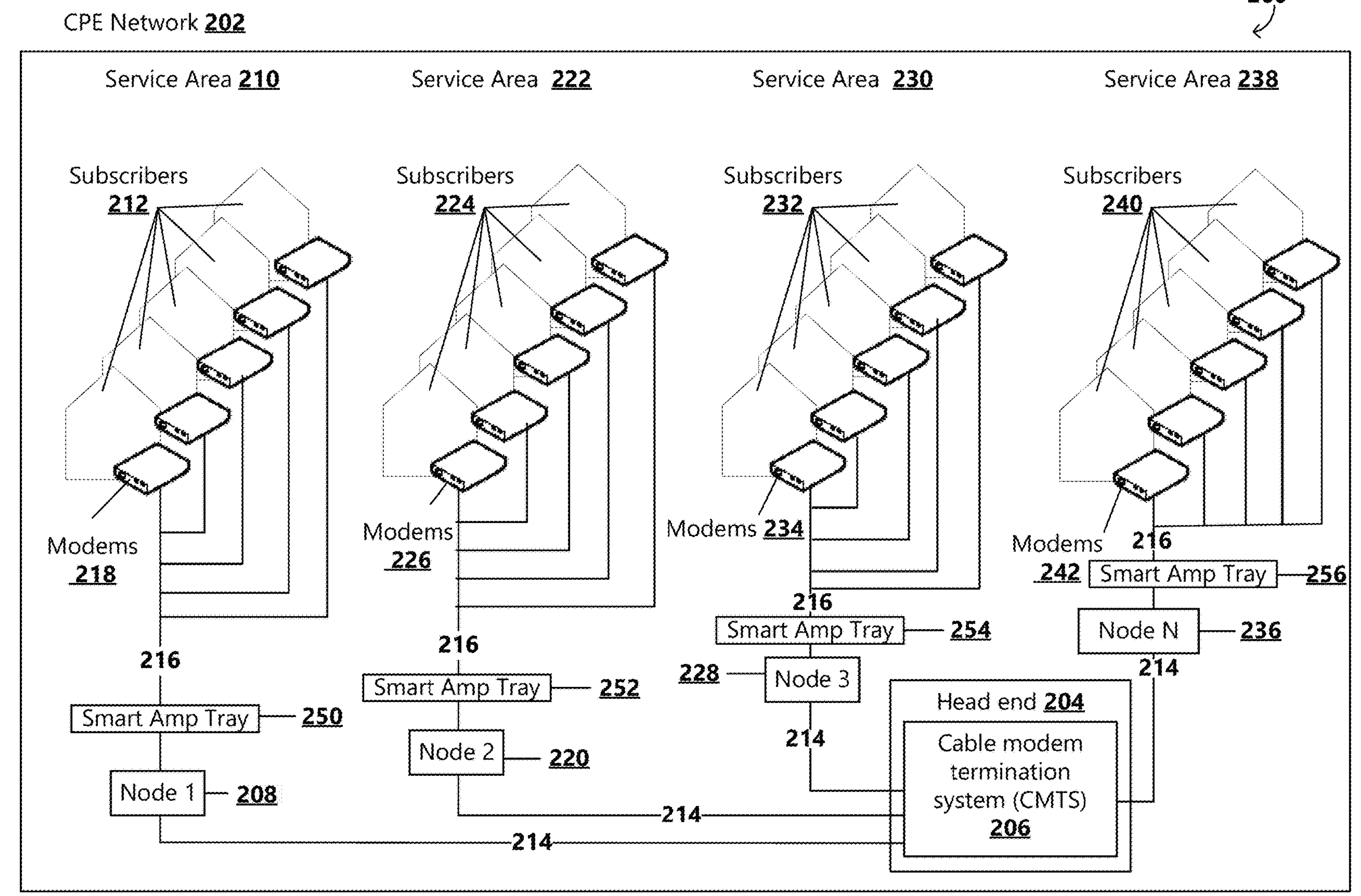
FIG. 2 is a block diagram of an example environment in which a Customer Premises Equipment (CPE) Network System of the present disclosure can be implemented.

Within the CPE Network System 200 shown in FIG. 2, the generation of ingress noise and egress noise is known to occur. The CPE Network System 200 shown in FIG. 2 can be characterized as a tree and branch system, whereby the system begins at the head end 204/Cable Modem Termination System (CMTS) 206 trunk and branches through nodes 208, modems 218, and subscribers 212 within a service area 210. The CPE Network 202 is divided into pieces, each such piece being identified as starting with a node, such as node 208. Each node comprises a multiple services operator (MSO) of the CPE Network 202. Different network metrics, such as signal to noise ratios, packet losses, In-Channel Frequency Response (ICFR), modem transmit level, and Cumulative Leakage Index (CLI) data are constantly monitored. When these metrics increase to a predetermined magnitude or a predetermined combined magnitude, then a node noise issue can be triggered or issued.

Currently, when ingress noise is detected, such as at a node 208, service technicians must travel to the node 208 location having the noise issue and start examining each of the modems 218 and related CPE devices to locate the source of the ingress noise generation by the process of elimination. The service technician's task is to reduce the number of branches within an identified portion of the CPE Network 202 to find the offending CPE device that is generating the ingress noise. Often the node device or box 208 is located outdoors, such as on a pole; is fed signals by fiber wiring and feeds many subscribers with coax cables to their respective homes or fiber wiring to the home.

The service technician often must start at an identified noise-generating node 208 and determine which signal output leg from that node is generating the upstream ingress noise and continue down that output leg, branch by branch, until the actual noise-generating device or connection is located and then repaired or replaced by the service technician. Since a node 208 can have hundreds of modems connected to it, this detection and localization is very manual and time-consuming. If the technician identifies the ingress noise-generating device at a particular home, but cannot access the home to test and/or repair the source of the ingress noise, the technician might be limited to leaving a note at the house and/or blocking the ingress noise from that customer's home. Alternately, the ingress noise could be generated from a cable connection outside a customer's home, and the technician can repair the ingress noise generating problem without having to access the home itself.

Ingress noise can negatively impact a customer's network service. It can ingress into a customer's home and can migrate into the network and negatively impact many of the customers being served by that particular node. The noise can cause modems 218 to go offline, cause service disruptions throughout the node area, cause network communication speeds to slow, and can cause upstream signal transmissions to carry uncorrectable noise bit errors, among other issues. Such errors can cause data packet loss at a higher layer, which can be detected by the customer through such related problems as the slowing of data uploads because of many packets having to be retransmitted because of detected packet loss.

The system disclosed herein can detect and localize the source of ingress noise quickly without having to start at a node 208 and manually and systematically work through the cables of the CPE Network 202. Rather than a week to manually analyze the many branches from a node, the system can, in a fraction of that time, analyze the data, learn from prior analyses, improve the knowledge of a Machine Learning (ML) Engine 102, and identify the equipment generating the ingress noise. By quickly bringing the CPE Network 202 back toward full capacity, speed, and performance, the system disclosed herein quickly allows the CPE Network 202 to have higher capacity, offer higher network speeds, and provide greater service and customer satisfaction.

Figure 1:
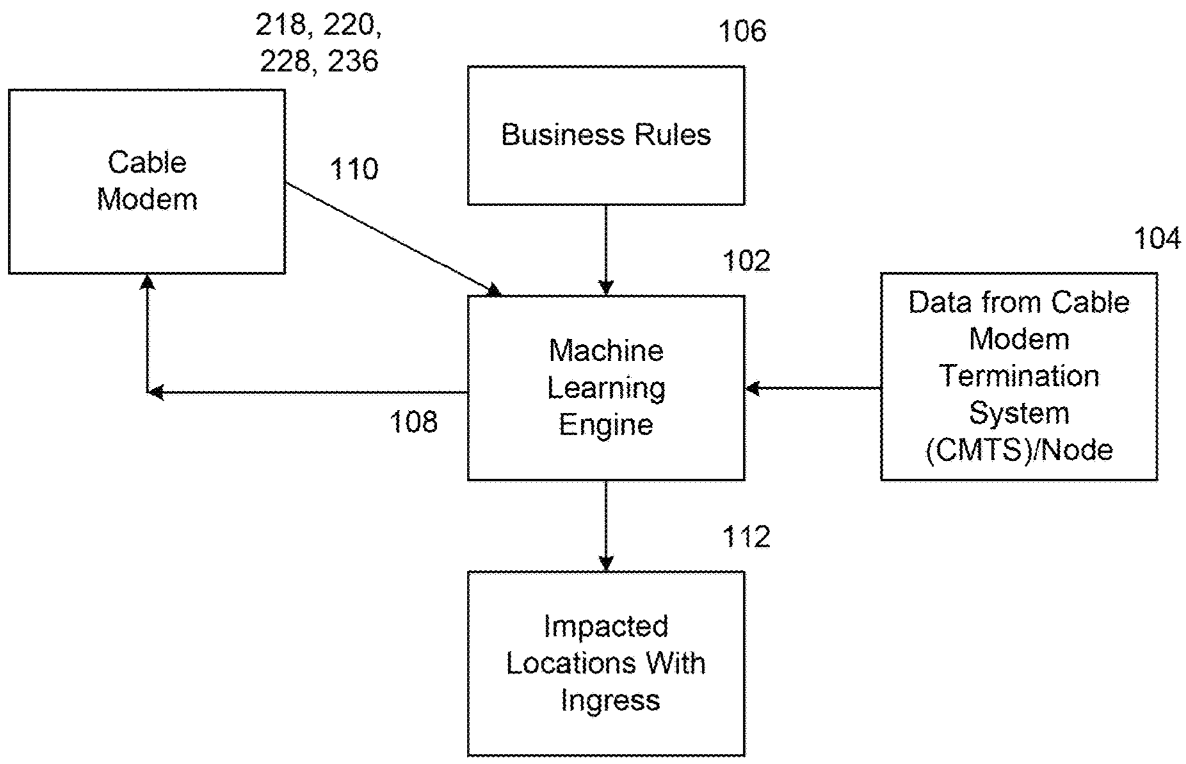
FIG. 1 is a block diagram of components of an example embodiment of a machine learning engine within an ingress detection and localization system according to an embodiment.

Referring first to FIG. 1 and FIG. 2, there is shown a block diagram of components of an ingress detection and localization system 100, including an example embodiment of a machine learning engine 102 (ML Engine) and a block diagram of an example environment in which a Customer Premises Equipment (CPE) Network System 200 of the present disclosure can be implemented. As illustrated in FIG. 1 and FIG. 2, the exemplary CPE Network System 200 is based upon a Machine Learning Engine 102 that utilizes programming instructions and Artificial Intelligence (AI) to guide transmissions from the CMTS 206 to and through the nodes, modems, and subscribers of the CPE Network System 200. The ML Engine 102 can be considered to be part of the CMTS 206 or part of the head end 204; although the ML Engine 102 can be housed elsewhere within the CPE network system 200. Data 104 from each of the nodes 208, 220, 228, 236 (collectively 208) is collected and input to the ML Engine 102. While this disclosure will focus on detecting and localizing ingress noise and issues, similar steps, processes, and equipment can detect and localize egress noise and issues within the CPE Network 202.

The data from the CMTS/node 104 includes device performance data that includes ingress noise data. As discussed in more detail below, this Data 104 includes different metrics that are being collected within the CPE Network System 200 for identifying the nodes and possibly the location of generated ingress noise at the modem 218, node 208, or at a Test Access Point (TAP) level. The amount of data from 104, 110, and 302 being collected and analyzed permit different control measurement levels to identify the devices generating excessive ingress noise. While not shown in FIG. 2, the CPE Network System 200 includes Test Access Points (TAPs) throughout its systems for connecting the CPE devices to each other within the cabling or communication infrastructure of the CPE Network System 200. These connections permit the ML Engine 102 to identify TAPs having excessive ingress noise, further permitting the ML Engine 102 to identify the source of the ingress noise and to signal the noisy device to modify their performance to reduce the ingress noise within the CPE Network System 200. Different control measurement levels and the Command Line Interface (CLI) data are used to identify the node and TAP having excess ingress noise.

The ML Engine 102 processes the collected data 104 to identify those nodes 208 experiencing significant ingress noise. The processing of the data 104 can be controlled or directed by optional rules 106 that can be input to the ML Engine 102. For example, the rules 106 may instruct the ML Engine to process data from particular nodes 208, during a specific time range(s), or having a particular level of noise. The ML Engine directs/transmits signals 108 to the modems 218, 226, 234, 240 (collectively 218) of the subscribers 212, 224, 232, 240 (collectively 212) based on its analysis of the data 104. For example, if the ML Engine 102 identifies a particular node 208 as having or experiencing ingress noise above a particular level (such as a first predetermined level, a second predetermined level, or a level determined by a rule 106), the ML Engine 102 can identify the modem or modems 218 that is or are fed by or connected to that node 208. The identification of the noise-generating devices can be transmitted 112 to service personnel or administrators for resolution. Alternately, the ML Engine 102 can identify the subscribers 212 that are serviced by or connected to that node 208. The ML Engine 102 then directs or transmits signals to the identified nodes 208, modems 218, and/or subscribers 212 with commands to address their performances.

Upon receipt of the ML Engine signals 108, the modems receiving the ML Engine signals 108 respond by transmitting modem data 110 back to the ML Engine 102 through the respective nodes 208 to which they are connected. The modem data 110 includes data unique to the respective modems 218 that have received the signals 108 from the ML Engine 102. This modem data 110 provides data to the ML Engine 102 that is unique to each of the transmitting modems 218, informing the ML Engine 102 how those respective modems 218 are performing and handling data. This modem data 110 includes data about the performance of each subscriber 212, modem 218, and node 208 and is received and analyzed by the ML Engine 102 to both train the ML Engine 102 and to customize the signals 108 that are subsequently sent to the modems 218.

For example, the modem data 110 can indicate to the ML Engine 102 that the amount or magnitude of the ingress noise has grown since the last exchange of data between the ML Engine 102 and the modems 218. Such an indication might suggest to the ML Engine 102 that the previous changes transmitted within the signals 108 to the modems 218 was either incorrect or insufficient. The ML Engine 102 will learn from this data and modify its signals 108 to the modems 218 accordingly and transmit the modified signals 108 to the modems 218. If the modem data 110 indicates that the magnitude of the ingress noise has diminished since the last exchange of data between the ML Engine 102 and the modems 218, the ML Engine can interpret this change in data as positive and that its prior signals 108 to the modems 218 were correct. If the resultant level of ingress noise in the modem data 110 is below a particular level, the ML Engine 102 can retain the same level of signals 108 to the modems 218 since those signals have instructed changes that have positively affected the ingress noise being generated through a particular node 208. If the level of ingress noise being detected by the ML Engine 102 has diminished but is still not at an acceptable, predetermined or rules-based level, the ML Engine 102 can modify the signals 108 being sent to the modems 218 to further identify the ingress noise being generated within the CPE Network System 200.

Smart Amplifier radio frequency trays (Smart Amp trays) (collectively 250, 252, 254, and 256) can be utilized within the CPE Network System 200 to help identify the location of ingress within a node. Further, cable leakage information data from the modem data 110 along with data captured from the previous exchange of data through the ML Engine 102 can be utilized to further isolate and thereby identify the ingress locations. For each location identified as generating ingress, the data related to that location will be stored in order to improve the ML Engine predictions creating an adaptive data collection and improvement feedback cycle. The remote switching capabilities in nodes and the Smart Amp trays 250 can localize the ingress generators because of noise funneling upstream. All modem upstream performance in a given service area is impacted by ingress from any customer location. By using remote switching at various points in the network, it allows the service provider to determine if a particular ingress source is deeper in the network than the switch point or not- or which leg of a node or multi-output amplifier has the most significant contribution to the problem. All of this information is input to or produced by the ML Engine 102 to provide further data 108 for controlling, and thereby, reducing the generation of ingress noise. Smart Amp trays 250 contain addressable devices allowing for remote collection of telemetry and/or remote control of switches that can be used to control attenuation or enabling of each port of the amplifier individually. This telemetry and remote control function can be used in a variety of ways, including but not limited to, signal processing, localization of ingress signatures to one or more ports, and remote configuration.

The ML Engine 102 is configured to constantly learn from the 108 signals sent to the modems 218 and from the modem data 110 sent from the modems 218 to the ML Engine 102, along with learning with the Smart Amp trays 250 signals and levels. The ML Engine 102 receives and analyzes the modem data 110 and modifies the signals 108 to be sent to the modems 218 to predict the ingress noise being generated at each modem location 208. This learning process by the ML Engine 102 is automatic and constant as long as the ML Engine is not instructed by a rule 106 to stop or modify its learning process. From this learning process, the ML Engine 102 can instruct the nodes 208, the modems 218, and/or the subscribers 212 to modify their performances and signal strengths to further manage the ingress noise being generated throughout the CPE Network System 200. For example, the ML Engine 102 can instruct certain devices to slow their respective transmission speeds to reduce the volume of data flowing to the subscribers 212.

Alternately, the ML Engine 102 can determine modem locations 218 that are generating large volumes of ingress noise. Upon such a determination, the ML Engine can automatically issue a notice proactively identifying such locations as noise sources for resolution. Further, if performance or decision-making by the ML Engine 102 is sought to be modified, an administrator can submit different or modified rules 102 to the ML Engine 102. For example, if the administrator is aware that a portion of the subscribers are going to be offline to the CPE Network System 200 because of network down time, the rules 106 can be modified to exclude those subscribers or the subscribers' affected modems 218 or nodes 208 from data signaling through the data 108 and 110 signaling. Additionally, flags or notices of down time areas or other aspects of the network can be flagged to the ML Engine for it to be automatically aware of such problems.

The signals 108 directed to the modems 218 can be considered round trip signals because the modem data 110 is respectively directed back to the ML Engine 102 by the modems 218 and/or nodes 208 after processing by the modems 218. For example, the ML Engine 102 can direct signals 108 to only those modems 218 that are connected to nodes 208 having an excess level of ingress noise. The level of ingress noise considered to be excess can be controlled through parameters or rules 106 directed to the ML Engine 102. The return modem data 110 from the modem 218 includes data associated with the performance of each modem, including ingress noise generated upstream from or through particular modems 218. The CPE devices within the network 202 can occasionally generate ingress noise upstream toward the head end 204 of the cable modem termination system (CMTS) 206. The devices can also generate egress noise downstream away from the CMTS 206 toward the subscribers 212.

According to an aspect of the present disclosure, one or more devices of the CPE Network 202 includes functionality to collect node, backend performance, and telemetry data associated with the performance and behavior of CPE devices within the network 202. In some examples, the CPE devices further include functionality to analyze one or more collected data values for assessing the health of the CPE devices, for example, for identifying an issue (e.g., network or connectivity issue, overheating, grounding, software, generation of ingress or egress noise) associated with the CPE device. In some examples, the CPE device further includes functionality to diagnose an identified issue. In some examples, the CPE device further includes functionality to communicate with other CPE devices (e.g., other CPE devices within the user premises and/or other CPE devices on a same node (with user permissions) for identifying and/or diagnosing an issue associated with the CPE device. Issue identification/detection and/or issue diagnostics/localization can be performed based on a set of rules 106. For example, self-check rules 106 may be used for automatic analysis of CPE device and system health and for identifying issues, and troubleshooting rules can be used for diagnosing an issue. Further, rules 106 may qualify which devices can be considered within the detection and localization processes disclosed herein.

In various implementations, the ML Engine 102 is operative or configured to provide a notification for display to a user, such as a notification of ingress noise that has not been reduced to an acceptable level or identification of a node or modem to which signals must be halted or whose data speed must be reduced to address ingress noise being generated through those devices. Accordingly, the ML Engine 102 is operative or configured to determine another method to provide the user-involved notification information to a user or service technician (e.g., via a guide user interface on another CPE device 102, an application user interface on a mobile phone, a chat or message interface on another device, an email, a phone call).

In some implementations, the CPE devices further include functionality to automatically troubleshoot an identified issue for diagnosing and self-resolving the issue. In other examples, the CPE devices include functionality to transmit collected telemetry data and metadata to the CPE server within the cable modem termination system (CMTS) 206, wherein the CPE server includes functionality to perform one or a combination of: remotely identify an issue associated with the CPE device based at least in part on the received data, determine or generate a troubleshooting plan for diagnosing and resolving the identified issue based on the identified issue and collected telemetry data, wherein generation of the troubleshooting plan is based on machine-learned insights, executing one or more troubleshooting steps of the plan (e.g., executing one or more troubleshooting rules based on the troubleshooting plan), detect and localize ingress generation, and providing instructions to the CPE device for enabling the CPE device to execute one or more troubleshooting steps of the troubleshooting plan for enabling the CPE to self-heal.

In various examples, the CPE devices include functionality to receive one or more troubleshooting steps from the ML Engine 102, to evaluate the one or more troubleshooting rules 106, and to perform one or more actions based on the steps or based on an evaluation of the rules 106. According to an aspect, the one or more actions can include actions associated with enabling the CPE device to detect and localize ingress generation, diagnose, troubleshoot, and repair an identified issue, notifying a user about the identified issue, instructing the user to perform troubleshooting and repair steps, providing additional data to the machine learning engine 102, etc.

According to an aspect, CMTS/Node Data 104 includes telemetry data and information about the CPE devices of the CPE Network System 200, how those devices are configured, performance of the devices, the operating environment of the devices, and health and quality-related information, such as information about the CPE Network 202 or connectivity to the CPE Network 202, signal levels, information about the functioning of hardware components, information about the functioning of software components, application signaling information, etc. In various examples, telemetry data includes sensor data. Sensor data can include data sensed by various sensors included in or communicatively attached to the CPE devices. For example, sensors can include sensors operative to measure various attributes, such as ingress noise from neighboring devices, temperature, voltage, fan speed, signal status (e.g., signal strength, signal quality), ingress, or egress, etc.

Embodiments of the CPE Network System 200, through the performance of the ML Engine 102, can affect self-repair and self-healing of the ingress noise generations through the transmitted signals 108 to the modems 218, in which the modems 218 respond to the signals 108 and reduce the generated ingress noise. For example, the signals 108 transmitted to the modems 218 can trigger or produce changes in the performance of the modems 218 such that ingress noise being generated by the modems 218 is reduced. Additional self-repair systems and processes are disclosed in U.S. Pat. No. 10,963,333, issued Mar. 30, 2021 and entitled Telematics-Based Network Device Troubleshooting and Repair, the content of which is incorporated herein by reference in its entirety.

Referring again to FIG. 2, there is shown is a conceptual system illustration 200 of an example customer premises equipment (CPE) network 202 in which a system for identifying and resolving excessive ingress may be implemented to alleviate network node congestion. The CPE Network 202 may extend from a head end 204 of a service provider to a plurality of nodes (e.g., 208, 220, 228, and 236), where each node serves a plurality of subscribers (e.g., 212, 224, 232, and 140, respectively). For example, the CPE network 202 may include thousands of nodes (collectively 208), with each node serving up to a 1,000 (or more) subscribers within a service area, where the subscribers may subscribe for residential and/or business services. For simplicity, four nodes are illustrated; however, there may be thousands of nodes within the CPE network 202. A first node 208 may serve a first set of subscribers 212 within a first service area 210. A second node 220 may serve a second set of subscribers 224 from a second service area 222. A third node 228 may serve a third set of subscribers 232 from a third service area 230. An $n^{th}$ node 236 may serve an $n^{th}$ set of subscribers 240 from an $n^{th}$ service area 238.

The service provider 204 may use a cable modem termination system (CMTS) 206 located within the head end 204 to provide high speed data services such as cable Internet, among other similar services, to the various sets of subscribers 212, 224, 232, and 240. For example, the CMTS 206 may encode, modulate, and upconvert one or more of the services onto radio frequency (RF) carriers, combine the RF carriers into a single electrical signal, and insert the electrical signal into a broadband optical transmitter. The broadband optical transmitter may convert the electrical signal to a downstream optically modulated signal that is sent to one or more of the nodes 208, 220, 228, and 236 over one or more fiber optic cable lines 214.

Each of the nodes 208, 220, 228, and 236 may include a broadband optical receiver to convert the downstream optically modulated signal to an electrical signal (e.g., translate the signal from a light beam to RF). The nodes 208, 220, 228, and 236 may send the electrical signal over one or more coaxial cable lines 216 to respective modems (e.g., 218, 226, 234, and 242) of the set of subscribers serviced by the node. For example, the first node 208 may send the electrical signal to modems 218 of the first set of subscribers 212. The second node 220 may send the electrical signal to modems 226 of the second set of subscribers 224. The third node 128 may send the electrical signal to modems 234 of the third set of subscribers 232. The $n^{th}$ node 236 may send the electrical signal to modems 242 of the $n^{th}$ set of subscribers 240. Each subscriber within a set of subscribers may have at least one modem, as illustrated. In some examples, RF amplifiers may be placed at intervals along the coaxial cables lines 216 to overcome cable attenuation and passive losses of the electrical signal caused by splitting or tapping the coaxial cables lines 216. Upon receipt of the electrical signal, the modems 218, 226, 234, and 242 may demodulate the electrical signal in order to deliver the services to one or more devices of the respective subscribers, including a desktop computer, laptop computer, a mobile phone, and a tablet, among other examples.

Additional example CPE devices for delivery of services can include cable or satellite television set-top boxes (STB), digital subscriber line (DSL) or other broadband Internet routers, voice over Internet protocol (VOIP) base stations, telephone handsets, streaming media players, or other customized hardware used by a particular telecommunications or media service provider. Many different types of CPE devices are available in the marketplace. According to an aspect, a CPE device includes functionality to receive content transmitted from a service provider system 206 and to descramble and/or decipher that content for consumption by a user. As should be appreciated, other types of CPE devices are possible and are within the scope of the present disclosure.

The CPE Network 202 may operate bi-directionally, whereby signals are transmitted in both downstream and upstream directions. For example, downstream signals may transmit data from the head end 204 to the modems 218, 226, 234, and 242 via the respective nodes 208, 220, 228, and 236. The data transmitted in the downstream signals may include content associated with the one or more services being provided, such as video content, voice data, and Internet data, among other examples. The downstream data can also include egress noise generated from one or more CPE devices and routed downstream from its origin. The upstream signals may transmit data from the modems 218, 226, 234, and 242 to the head end 204 via the nodes 208, 220, 228, and 236. The data transmitted in the upstream signals may include control signals. The control signals may include requests for additional content to be provided and/or performance of actions associated with the services. The upstream signals can also include ingress noise generated from one or more CPE devices and routed upstream from its origin.

As additional subscribers are added to one or more of the nodes 208, 220, 228, and 236, or if one or more of the set of subscribers 212, 224, 232, and 240 already serviced by one of the nodes 208, 220, 228, and 236 increase their data usage, one or more of the nodes 208, 220, 228, and 236 may become congested. As congestion increases, a speed at which services are provided may be decreased, often resulting in subscriber frustration. A level of congestion may be determined by measuring a utilization of each of the nodes 208, 220, 228, and 236 based on utilization data collected by the CMTS 206.

To provide an example, utilization of the first node 208 may be measured. The CMTS 206 may monitor an amount of data transmitted in downstream signals from the CMTS 206 to the modems 218 via the first node 208 and an amount of data in the upstream signals received by the CMTS 206 from the modems 218 via the first node 208 over a period of time. The amount of data transmitted and/or received may be compared to a data capacity for the first node 208 to determine the utilization. In some embodiments, a computing device associated with the CMTS 206 may perform the monitoring and comparison to determine the utilization. A utilization above a predetermined threshold (e.g., 70%) may indicate congestion on the first node 208, and performance of an action to alleviate the congestion may be desirable to prevent slowing of service speed and subsequent subscriber frustration.

Conventionally, in response to a determination that the utilization of the first node 208 was above the predetermined threshold, the first node 208 could be split into two new nodes, among which the first set of subscribers 212 would be divided. However, node splitting is expensive and impacts the service provided to the first set subscribers 212 of the first node 208 as it is being split. Additionally, because the assumption on which node splitting is based (e.g., that each subscriber is using services equally) is often not true and issues other than sheer data usage may be causing the congestion, node splitting may not alleviate the congestion as intended.

However, in some embodiments, because the CPE network 202 may have thousands of nodes, with each node servicing between 100 and 1,000 subscribers or more, the system may preserve resources by prioritizing the nodes 208, 220, 228, and 236. Only nodes with higher priorities (e.g., higher revenue at risk values) that have a utilization above the predetermined threshold indicative of congestion may be selected for the CPE Network 202 to identify which subset of subscribers have excessive data usage, determine causes for the excessive data usage, and determine actions to be performed in order to alleviate the congestion.

Figure 3:
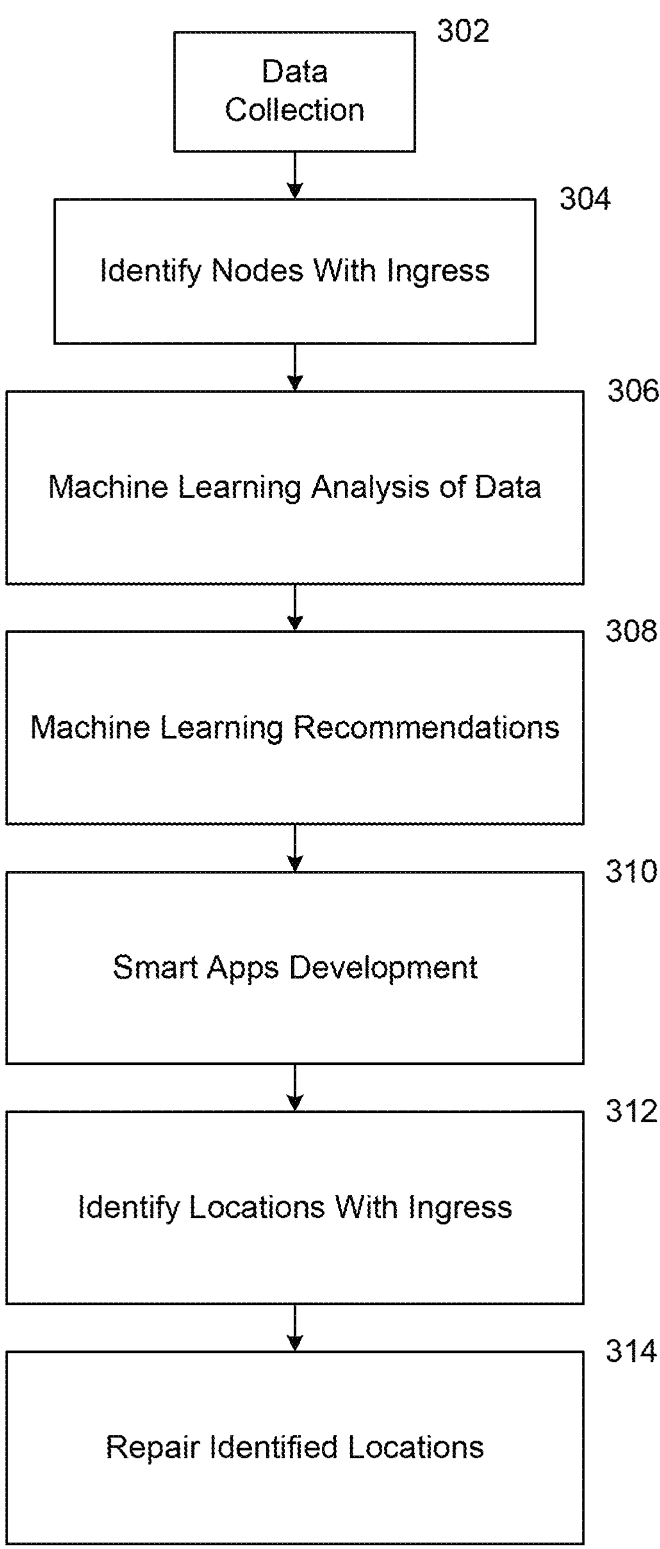
FIG. 3 is a flow diagram illustrating an example sequence of steps for detecting and localizing ingress within the CPE Network System according to an embodiment.

Referring next to FIG. 3, there is shown is a flow diagram illustrating an example sequence of steps for detecting and localizing ingress within the CPE Network System 200 according to an embodiment. Within this flow diagram, the ML Engine 102 will evaluate data at a node level to gather and analyze the upstream data and the downstream data to determine whether particular homes/houses are introducing ingress noise into the CPE Network 202. The flow shown in FIG. 3 is a layered approach that gets more specific at each layer of data. This flow begins with data collection at 302. This data collection captures all the data sets within the CPE network 202 from the cable modems (218, 226, 234, 242), nodes (208, 220, 228, 236), CLI data, CMTS (206), rules (106), Smart Amp tray 250 data, subscriber data, service provider data, upstream data, downstream data, etc. While this data may exist in some existing CPE Network Systems 200, it is not being utilized in a way that provides the wholistic view of ingress detection and localization as provided within this disclosure.

Figure 4:
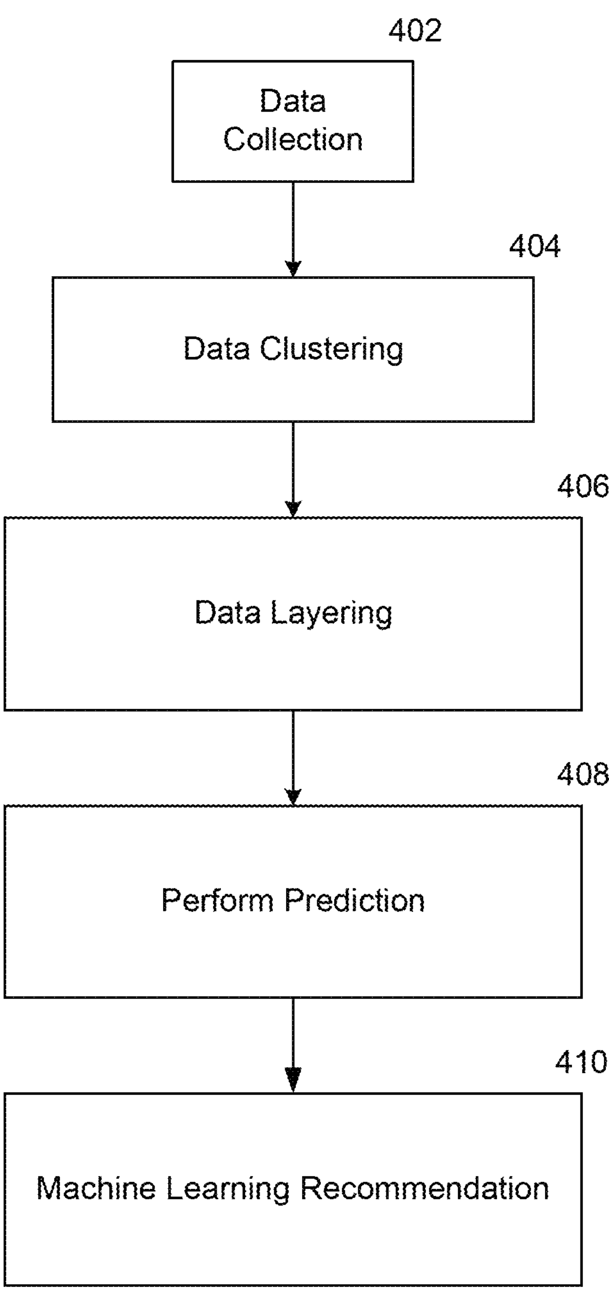
FIG. 4 is a flow diagram illustrating an example sequence of steps within a machine learning engine for clustering and layering network telemetry/signal performance data according to an embodiment.

The Smart Amps tray 250 data is fed to the ML Engine 102 in order to identify the nodes 208, modems 218, and/or homes/subscribers 212 generating ingress noise at 304. The collected data will also be processed at step 306 as discussed with reference to FIG. 4 below for machine learning of the collected data by the ML Engine 102. The remaining captured data, such as CLI data, rules 106, Smart Amp trays 250 data, and customers' information are all fed to the ML Engine 102 at 308 for analysis to identify the path and locations of ingress in the form of ingress resolution recommendations. The machine learning recommendations developed from the ML Engine 102 at 308 are also shown in FIG. 4 as 410.

The ML Engine 102 can use one or both of subgroup discovery and analytics (SCAN) and support vector machines (SVM) to predict which CPE devices are generating ingress noise within a node 208 region of the CPE Network 202. The SCAN method can be used by itself, thereby bypassing the SVM devices. If this prediction output from the ML Engine 102 does not efficiently identify a single or small number of ingress generation locations, such as several homes, then SVM could be performed with the SCAN operation, thereby predicting ingress generation locations based on the clustered data.

The ML Engine 102 will be fed data captured from homes where prior ingress noise has been detected, localized, and repaired. The ML Engine 102 will also input data identifying homes whose residents do not want their sourced ingress noise to be fixed (they have refused to let technicians inside the house). Including data for these "refused" homes will help improve the predictability of the ML Engine recommendations at steps 308 and 410 as these homes are known to be generating ingress noise. This data layering approach identifies and isolates groups of homes that are known to be ingress noise free and known to be generative of ingress noise (if not having been remedied). This information is fed into the ML Engine 102 to instill the ML engine 102 with the knowledge of noise-free and noise-generating CPE devices with the CPE Network 202, thereby training the ML Engine 102 with the knowledge of CPE equipment within a particular, identified node 208 as likely being either noise free or noise generative.

Alternately, filters can filter out portions of the upstream (i.e., signals routing from a subscriber 212 to a node 208) data flow, thereby trapping the noise generating signals without killing the entire upstream network to the node 208. By this technique, the signals from a noise-generating CPE device that is inaccessible within a house can be blocked, or filtered out of consideration, to permit determination of whether other nearby CPE devices are contributing to the ingress noise generation.

This ML Engine analysis will help the technicians look at the pre-equalization tap-cascade levels to identify homes with impedance discontinuity at that tap. The ML Engine 102 will be able to locate the home with the noise discontinuity. The ML Engine 102 then performs distance calculation from the node 208 to the home 212. This calculation will be mapped to a service technician by presenting the mapping onto a user device with exact locations of homes with addresses and location(s) of impedance discontinuity. If the ML Engine 102 is not able to identify or locate the home generating the ingress noise, then the ML Engine 102 can identify clusters of several homes with the footages to the homes from the node 208 servicing those homes 212. Additionally, the user interface will show the cable modem pre-equalization data such as In-Channel Frequency Response (ICFR) information if the homes are out of a good range for the service technician, and relate that information to the wiring of the home rather than ingress that is being generated outside the home.

The machine learning recommendations are delivered to a series of Smart Amp trays 250 at 310 for identifying, by the ML Engine 102, each modem-location of generated ingress noise within each node's respective system of modems 218, at step 312. Further, cable leakage information (CLI) data along with data captured during the previous data collection step 302 is analyzed to isolate the ingress locations. The ML Engine 102 can use the switching functionality and telemetry gained from Smart Amp trays 250 to isolate specific cable network segments where the ingress is believed to be entering the network. When combined with the cable leakage information data, this can localize the sources of this ingress noise with a higher degree of confidence. For each modem location identified as generating ingress noise, the data will be stored in order to improve the ML Engine 102 predictions creating an adaptive data collection and improvement feedback cycle (i.e., the turn-around signaling process disclosed above). The remote switching capabilities in nodes 208 and Smart Amp trays 250, will localize ingress to particular CPE devices, such as modems 218, because of upstream noise funneling and that all modem upstream performance in a given service area is impacted by ingress noise from any customer location.

By using remote switching at various points in the CPE Network 202, the ML Engine 102 or the service provider can determine if a particular source of ingress noise is deeper in the network than the switch point or not—or which leg of a node 208 or multi-output amplifier has the most significant contribution to the problem. With this location information, the ML Engine 102 or the service provider can optionally implement steps to repair the identified ingress noise at 314. The ML Engine 102 can be configured to perform this repair function automatically through rules 106 that are input to the ML Engine 102. By significantly reducing the number of computer premises equipment, such as modems 218, taps, wire connections, and nodes 208 to a single home, modem 218, connection, or node 208 to single or a few devices, the system disclosed herein drastically reduces the number of devices that should be checked and modified to reduce the generation of the ingress noise. Further, the rules 106 and data 104, 110, 302, and 402 can automatically be adjusted by the ML Engine 102 to address the identified ingress noise generation by modifying the performance and operation of identified CPE devices such that the noise generation is reduced or eliminated. While service technician calls to repair and/or adjust CPE devices are significantly reduced by the identification of specific CPE devices within this system, those calls can be eliminated in many instances by the automatic adjustment steps disclosed herein. These repair and adjustment time and cost savings will also maintain the CPE Network System 200 at optimum performance levels by reducing ingress generation within the System 200 and thereby minimizing any need to slow CPE device performance levels to avoid the ingress noise.

Referring next to FIG. 4, there is shown is a flow diagram illustrating an example sequence of steps within a ML Engine 102 for clustering and layering network telemetry/signal performance data according to an embodiment. This process corresponds to the Machine Learning Analysis of Data 306 of FIG. 3. This flow begins with data collection at 402. This data collection captures and stores all the data sets within the CPE network 202 from the cable modems (218, 226, 234, 242), nodes (208, 220, 228, 236), CLI data, CMTS (206), rules (106), Smart Amp tray 250 data, subscriber data, service provider data, upstream data, downstream data, etc. Part of the machine training of the ML Engine 102 is performed from data from homes 212 that do not generate any ingress noise. Other data that is used in training the ML Engine 102 is captured from homes 212 that are generating ingress noise. This latter data is added to the data from homes without ingress noise so the ML Engine 102 can learn which homes are problematic—i.e., homes that are producing ingress noise that should be remedied. This mixture of data helps identify and localize to the ML Engine 102 which homes under a node need repairs.

The collected data will be clustered at 404, which is the gathering of data per node 208, using a Partitioning Around Medoids (PAM) algorithm to cluster data that will imply ingress versus other data sets which show no ingress data. PAM is similar to K-means clustering but uses medoids (the most centrally located point in the cluster as it's center) instead of centroids. The algorithm aims to find a group of central objects in clusters, known as medoids. Initially, some objects are tentatively picked as medoids and put into a group called set S. The rest of the objects, which aren't picked, belong to another group called set U. The main goal of the algorithm is to reduce the average distance or dissimilarity between each object and the nearest object in set S. In other words, it tries to make sure that all objects are as close as possible to any of the chosen medoids. The formula is represented by $$\text{Total Dissimilarity} = \sum_{j=1}^{m} D(x_j, m(x_j))$$

Where m is the total number of objects; x; is each individual object in the data set; $m(x_j)$ is the mediod closest to the object $x_j$; $D(x_j, m(x_j)$ is the dissimilarity between the object $x_j$ and its closet medoid $m(x_j)$. This method will allow clustering the collected data accordingly in order to identify ingress and specify the impacted nodes and homes. This occurs after training the ML Engine 102 with locations where ingress is detected and is not detected, as discussed above. Clustering permits the detection of nodes 208 with ingress versus nodes without ingress and the number of ingress locations based on the data collected.

Clustering the data received from the CPE devices such as nodes and homes that is identified as being excessively noisy can be used to train the ML Engine 102 and its algorithms to identify problem CPE equipment generating ingress noise. This is accomplished by a three layer process of identifying, learning, and applying that knowledge. When a service truck drove through an area, did it encounter any hits on the CLI in that area, or has the ML Engine 102 or CMTS 206 identified nodes 208 recording high levels of ingress noise? If so, at the first layer of ML Engine 102 training, the system recognizes that it has a problem in the service area 210 that is identified by that node 208, and the homes 212 that are downstream from that node location. The system identifies the node having the ingress noise issue, based on the metrics being collected and monitored. The system is training the ML Engine 102 and algorithm to identify what does it look like when everything downstream of the homes 212 is good versus what does it look like when something downstream the homes 212 is bad (i.e., generating ingress noise). The ML Engine 102 then segments out the CPE Network 202 to determine that the problem ingress noise issue is located somewhere within a span of two Smart Amp RF trays 250. That is, the problem CPE device is localized between two Smart Amp RF trays 250. One of those Smart Amp trays 250 will be showing ingress noise and the second Smart Amp tray 250 will not be showing any ingress noise. The metrics, associated with the CPE devices that are located between these two Smart Amp trays 250 within the CPE Network 202, that have been captured and stored for use by the ML Engine 102 are queried to determine the CPE device which is the likely source of the ingress noise.

For example, the spectrum data for the FM band for these "involved" CPE devices can be examined to localize the source of the ingress noise because out-of-range spectrum data for the FM band can be an indication of noise generation. Are we seeing ingress data that is coming in to/from a modem, because that is a clue. Further, whenever there is a broken or open connection in a signal cable, such as in a home, the home has an open signal window where air/signals can go out and air/signals can also come in. Once the noise generation is localized within a particular span of space, which may be about 1,500 feet, any and all of the additional captured metrics can be used to determine which particular, individual premise, cable, or CPE device in the CPE Network 202 is creating the issue (third) (because the issue may be originating within the network but not within a particular home).

Home/customer address data can be clustered within geographic areas by street name, thereby creating non-overlapping clusters of possible ingress noise sources by prioritizing boundary addresses, types of CPE devices, number of CPE devices within each home, speed tiers of CPE devices, etc. Additionally, home locations can be identified based on FM broadcast locations or other impacts on sharing the same frequency for the upstream data.

For example, the ML Engine 102 is taught that some of the captured data elements that will be collected and fed to the ML Engine 102 are the In-Channel Frequency Response (ICFR) data for each modem 218. If the ICFR value is not flattened or within the desired range (e.g., 0.5 dB per 1 MHz channel width), then the ML Engine 102 will keep and collect that information to maintain that the CMTS is indicating a good, received signal. The upstream frequencies and the downstream frequencies are collected and analyzed to identify which frequencies are being impacted by the ingress noise. The downstream and upstream receive and transmit levels will fluctuate, and the range of acceptable values of no ingress, or the values with ingress will be assessed. Large fluctuations in transmit or receive levels can also be an indicator of poor connections to the network, which are frequently the sources of ingress. The ML Engine 102 can isolate those modems that have variance in transit and receive levels that are outside the normal range and control limits of the other modems served by the node 208. The same will apply to the SNR values. To identify FM stations, there are several available options such as radio scanners that could be used to detect the active FM frequencies; software-defined radio to scan the FM frequency bands and automate the detection of active stations; or automated scanning software among other solutions as these are examples. All of the above data from the telemetry data or FM stations and frequencies are fed to the ML Engine 102 as part of the data collection in order to identify ingress and the source of ingress. Noise could be generated from FM stations, and this will confuse the ingress coming from homes. Identifying the location and the band of frequencies will improve the accuracy of the ML Engine 102 recommendation and ingress predictions.

The collected Cable Modem (CM) data can be clustered and analyzed by a Modem Data/Spectrum analyzer (optionally part of the ML Engine 102) to compare the upstream data from a modem 218 to the node 208 or to the CMTS 206 to determine whether there are frequency differences between the modem 218 and either the node 208 or the CMTS 206. Any such determined difference can inform the ML Engine 102 that the modem 218 is not transmitting upstream data (besides any burst values) and that the modem signal caught at a specific frequency is ingress noise that needs to be resolved at the home level, which address is within the data collected by the ML Engine 102. The ML Engine 102 is further taught to identify the DOCSIS version in use within the CPE Network System 200 and the type of network 200 in use (mid-split, high split, or ultra-high split). These determinations will help isolate the specific CPE devices that may be using areas of the network frequency spectrum. For example, a mid-split CPE device can use the 40-85 MHz region for upstream traffic while a sub-split device could not, which is information helpful to the ML Engine resolve identified ingress noises. Further, the ML Engine 102 can be taught to identify any clippings at the upstream data level and to test any correlated impacts to the downstream speed or bandwidth that may be impacted by the ML Engine ingress noise resolution efforts. Upstream Modulation Error Ratio can help identify nodes 208 that may be experiencing ingress, and permit the ML Engine 102 to reduce the ingress noise at the node level.

Based on the collected data, the ML Engine 102 is able to determine if the address of the CPE device generating the ingress noise is associated with a service provider-managed gateway or is associated with a non-managed device. This information can allow the ML engine 102 to more easily localize the ingress noise producing homes and to more easily resolve service provider-managed gateway devices by communicating to or through the service provider of ingress noise resolution steps to be taken.

The collected data can be further clustered based on the type of data correlated with the physical address of the device generating the ingress noise, the IP address, or the MAC address. The clustering techniques could be hierarchical or density-based to eliminate any homes that are not generating ingress noise. Such clustering will be a filter to remove those homes from consideration by the ML Engine, thereby reducing the number of possible sources of ingress noise and reducing the time and cost of identifying the homes/modems generating the ingress noise. Further data clustering can be performed based on time of day, thereby removing from consideration by the ML Engine 102 CPE devices that are not active during known times.

All the collected data can be utilized by the ML Engine 102 using a classification model along with a deep learning module that will suppress any good data (i.e., non-ingress noise data) and move all the bad data or predicted bad data to the ML Engine 102 for analysis. All the bad data will be used to build a regression model to identify which homes are generating ingress noise or several homes on a node that are generating ingress noise or are suspected of generating ingress noise. Once a home is identified by the ML Engine 102 as generating ingress noise or being suspected of generating ingress noise, that particular data will be marked for future use in identifying homes that are generating ingress noise. This marking of the data to be stored will reduce checking those identified ingress noise generating several homes for ingress noise generation. The ML Engine 102 will be educated to understand these markings and classify the corresponding homes as known for generating ingress noise during the clustering, layering, prediction, and recommendation steps of FIG. 4. This labeling can be further enhances by teaching the ML Engine 102 to weight certain labels so that the labeled data will be given higher authority by the ML Engine during the processes shown in FIG. 3 and FIG. 4.

Figure 5:
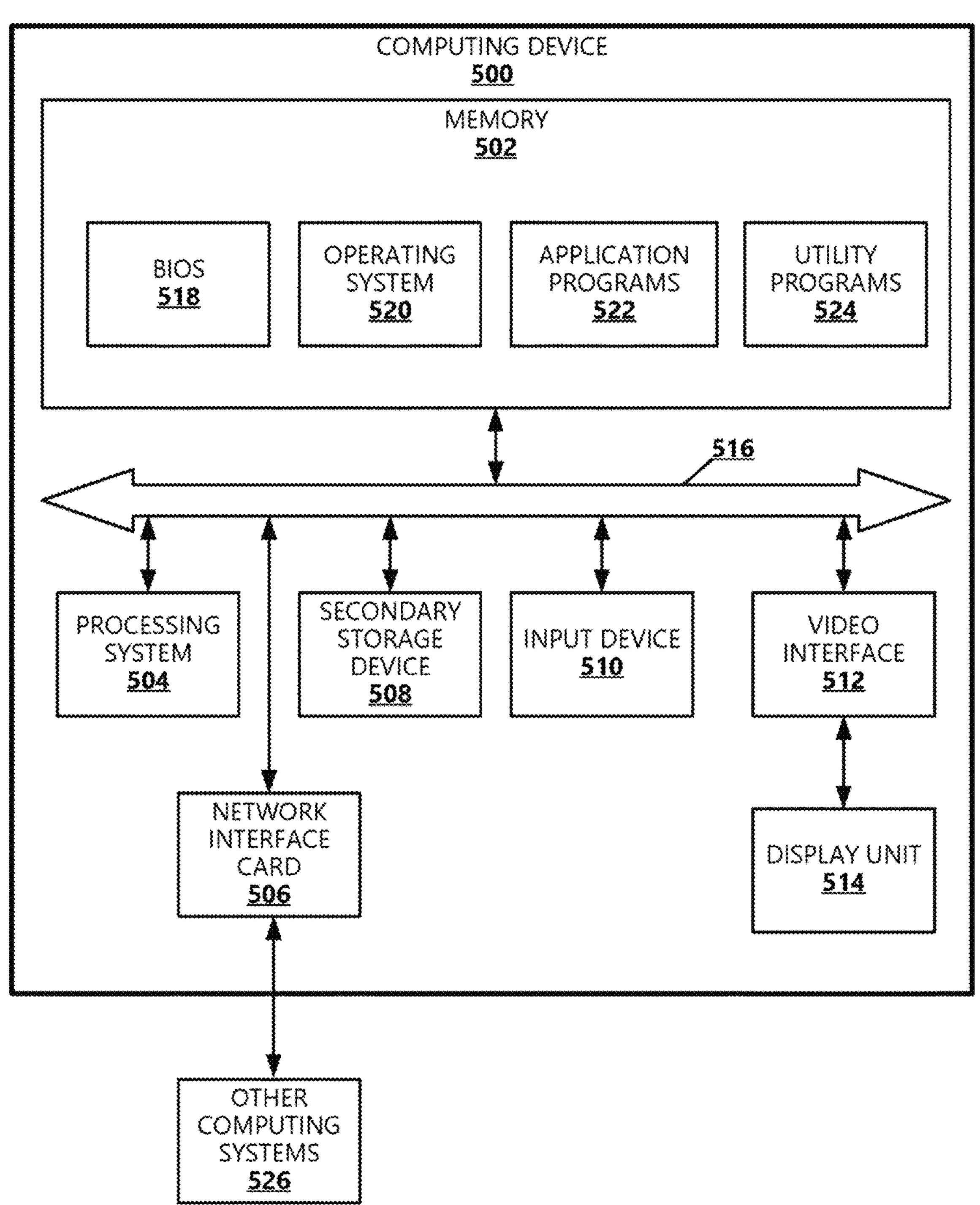
FIG. 5 is a block diagram illustrating example physical components of a computing device or system with which embodiments may be practiced.

Referring next to FIG. 5, there is shown a block diagram illustrating example physical components of a computing device or system 500 with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface 506 (wired and/or wireless), radio/antenna 507, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. Memory 502 may store the computer-executable instructions that, when executed by processor 504, provide telematics-based device troubleshooting, self-repair, and optimization. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable, transitory and non-transitory media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 6:
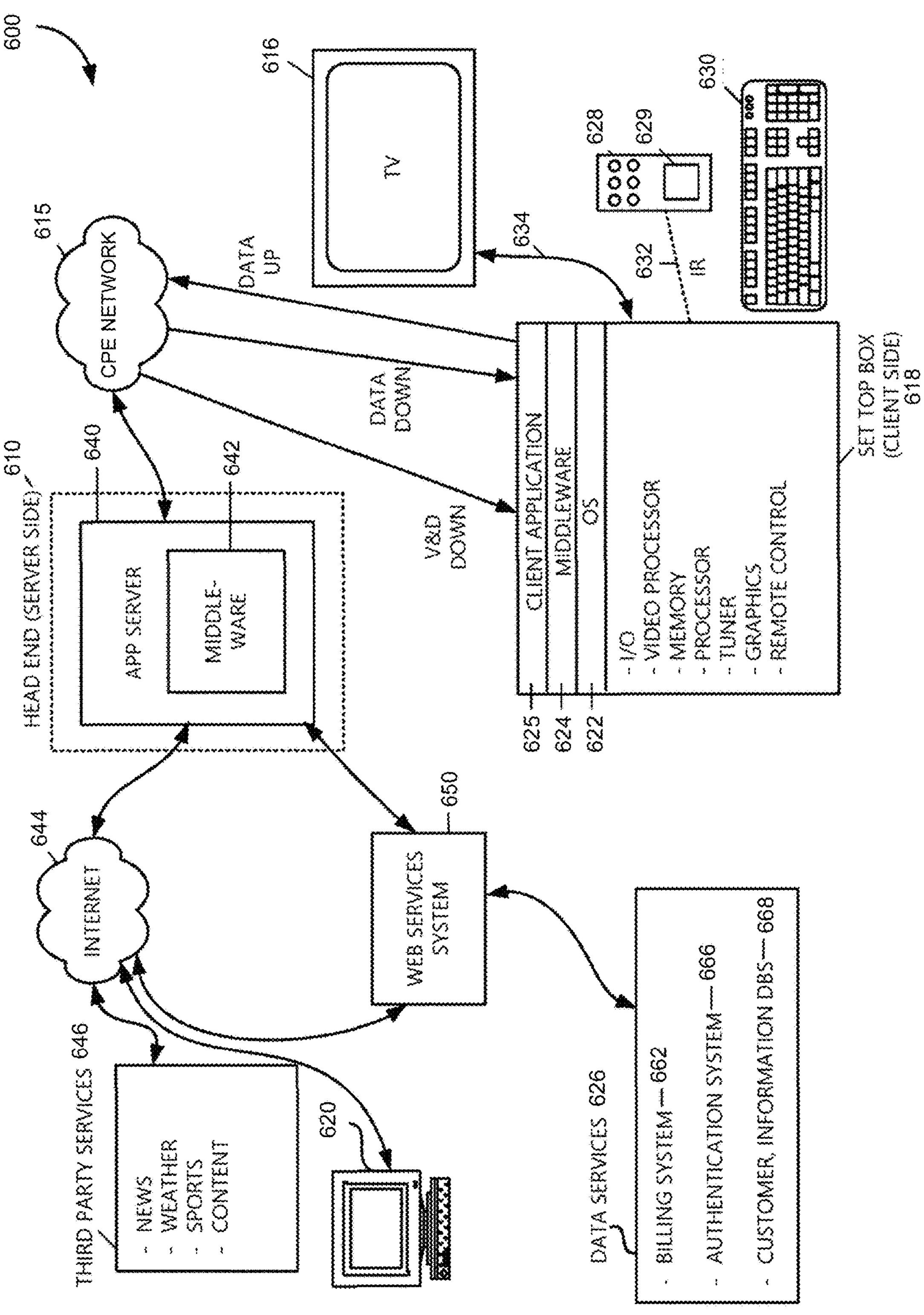
FIG. 6 is a block diagram illustrating components of a cable services system architecture providing an example operating environment according to aspects of the present disclosure.

Referring to FIG. 6, there is shown a block diagram illustrating a cable television services system 600 (CATV) architecture providing an operating environment according to an aspect. As should be appreciated, a CATV services system 600 is but one of various types of systems that can be utilized for providing telematics-based device ingress detection and localization, troubleshooting, and optimization as described herein. Referring now to FIG. 6, digital and analog video programming, information content, and interactive television services are provided via a hybrid fiber coax (CPE) network 202/615 to a television set 616 for consumption by a cable television/services system customer/subscriber. As is known to those skilled in the art, CPE networks 202/615 combine both optical fiber and coaxial cable lines. Typically, optical fiber runs from the cable head end 204/610 to neighborhoods of subscribers 212. Coaxial cable runs from the optical fiber feeders to each customer or subscriber 212. The functionality of the CPE network 202/615 allows for efficient bidirectional data flow between the set-top box 618 and the application server 640 of the aspect.

The CATV system 600 is in the form of a distributed client-server computing system for providing video and data flow across the CPE network 202/615 between server-side services providers (e.g., cable television/services providers) via a server-side head end 204/610 and a client-side customer/subscriber 212 via a set-top box (STB) 618 functionally connected to a customer receiving device, such as the television set 616. As is understood by those skilled in the art, modern CATV systems 600 can provide a variety of services across the CPE network 202/615 including traditional digital and analog video programming, telephone services, high speed Internet access, video-on-demand, and services.

On the client side of the CATV system 600, digital and analog video programming and digital and analog data are provided to the customer television set 616 via the STB 618. Interactive television services that allow a customer to input data to the CATV system 600 likewise are provided by the STB 618. As illustrated in FIG. 6, the STB 618 is a multipurpose computing device having a computer processor, memory, and an input/output mechanism. The input/output mechanism receives input from server-side processes via the CPE network 202/615 and from customers via input devices such as a remote control device 628, keyboard 630, or other computing device, such as a tablet/slate computer, smart phone, etc. The remote control device 628 and the keyboard 630 can communicate with the STB 618 via a suitable communication transport such as the infrared connection 632. The remote control device 628 can include a biometric input module 629. The STB 618 also includes a video processor for processing and providing digital and analog video signaling to the television set 616 via a cable communication transport 634. A multi-channel tuner is provided for processing video and data to and from the STB 618 and the server-side head end system 204/610, described below.

The STB 618 also includes an operating system 622 for directing the functions of the STB 618 in conjunction with a variety of client applications 625. For example, if a client application 625 requires a news flash from a third-party news source to be displayed on the television 616, the operating system 622 can cause the graphics functionality and video processor of the STB 618, for example, to output the news flash to the television 616 at the direction of the client application 625 responsible for displaying news items.

Because a variety of different operating systems 622 can be utilized by a variety of different brands and types of set-top boxes 618, a middleware layer 624 can be provided to allow a given software application to be executed by a variety of different operating systems. According to an embodiment, the middleware layer 624 can include a set of application programming interfaces (APIs) that are exposed to client applications and operating systems 622 that allow client applications 625 to communicate with the operating systems 622 through common data calls understood via the API set. As described below, a corresponding middleware layer 642 is included on the server side of the CATV system 600 for facilitating communication between the server-side application server and the client-side STB 618. The middleware layer 642 of the server-side application server and the middleware layer 624 of the client-side STB 618 can format data passed between the client side and server side according to the Extensible Markup Language (XML).

According to one aspect, the STB 618 passes digital and analog video and data signaling to the television 616 via a one-way communication transport 634. According to other aspects, two-way communication transports can be utilized, for example, via high definition multimedia (HDMI) ports. The STB 618 can receive video and data from the server side of the CATV system 600 via the CPE network 202/615 through a video/data downlink and data via a data downlink. The STB 618 can transmit data from the client side of the CATV system 600 to the server side of the CATV system 600 via the CPE network 202/615 via one data uplink. The video/data downlink is an "in band" downlink that allows for digital and analog video and data signaling from the server side of the CATV system 600 through the CPE network 202/615 to the STB 618 for use by the STB 618 and for distribution to the television set 616. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 6, between the CPE network 202/615 and the set-top box 618 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 618 and the server-side application server 640 is typically passed through the "out of band" data links. Alternatively, an "in band" data carousel can be positioned in an "in band" channel into which a data feed can be processed from the application server 640 through the CPE network 202/615 to the STB 618. Operation of data transport between components of the CATV system 600, described with reference to FIG. 6, is well known to those skilled in the art.

Referring still to FIG. 6, the head end 204/610 of the CATV system 600 is positioned on the server side of the CATV system and includes hardware and software systems responsible for originating and managing content for distributing through the CPE network 202/615 to client-side STBs 618 for presentation to customers. As described above, a number of services can be provided by the CATV system 600, including digital and analog video programming, interactive television services, telephone services, video-on-demand services, targeted advertising, and/or provision of supplemental content.

The application server 640 can be configured as a computing system operative to assemble and manage data sent to and received from the STB 618 via the CPE network 202/615. As described above, the application server 640 includes a middleware layer 642 for processing and preparing data from the head end 204/610 of the CATV system 600 for receipt and use by the client-side STB 618. For example, the application server 640 via the middleware layer 642 can obtain supplemental content from third-party services 646 via the Internet 644 for transmitting to a customer through the CPE network 202/615, the STB 618, and recording by a local or remote DVR. For example, content metadata from a third-party content provider service can be downloaded by the application server 640 via the Internet 644. When the application server 640 receives the downloaded content metadata, the middleware layer 642 can be utilized to format the content metadata for receipt and use by the STB 618. Therefore, content metadata can be sent and categorized based on the availability to the customer's program guide data.

According to one embodiment, data obtained and managed by the middleware layer 642 of the application server 640 is formatted according to the Extensible Markup Language and is passed to the STB 618 through the CPE network 202/615 where the XML-formatted data can be utilized by a client application 625 in concert with the middleware layer 624, as described above. As should be appreciated by those skilled in the art, a variety of third-party services data 646, including news data, weather data, sports data and other information content can be obtained by the application server 640 via distributed computing environments such as the Internet 644 for provision to customers via the CPE network 202/615 and the STB 618.

According to aspects, the application server 640 obtains customer support services data, including billing data, information on customer work order status, answers to frequently asked questions, services provider contact information, and the like from data services 626 for provision to the customer via an interactive television session. The data services 626 include a number of services operated by the services provider of the CATV system 600 which can include profile and other data associated with a given customer.

A billing system 662 can include information such as a customer's name, street address, business identification number, Social Security number, credit history, and information regarding services and products subscribed to by the customer. According to embodiments, the billing system 662 can also include billing data for services and products subscribed to by the customer for bill processing, billing presentment and payment receipt.

A customer information database 668 can include general information about customers such as place of employment, business address, business telephone number, and demographic information such as age, gender, educational level, and the like. The customer information database 668 can also include information on pending work orders for services or products ordered by the customer. The customer information database 668 can also include general customer information such as answers to frequently asked customer questions and contact information for various service provider offices/departments. As should be understood, this information can be stored in a variety of disparate databases operated by the cable services provider.

Referring still to FIG. 6, web services system 650 is illustrated between the application server 640 and the data services 626. According to aspects, web services system 650 serves as a collection point for data requested from each of the disparate data services systems comprising the data services 626. According to aspects, when the application server 640 requires customer services data from one or more of the data services 626, the application server 640 passes a data query to the web services system 650. The web services system 650 formulates a data query to each of the available data services systems for obtaining any required data for a requesting customer as identified by a set-top box identification associated with the customer.

The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above. An authentication system 666 can include information such as secure user names, subscriber profiles, subscriber IDs, and passwords utilized by customers for access to network services. As should be understood by those skilled in the art, the disparate systems 650, 662, 666, and 668 can be integrated or provided in any combination of separate systems, wherein FIG. 6 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

What is claimed is:

1. A method for ingress detection and localization within a customer premises equipment network, comprising:

collecting data associated with customer premises equipment activities within a customer premises equipment network;

detecting, with a machine learning engine, customer premises equipment nodes within the collected data that are generating ingress data above a first predetermined level;

identifying locations of ingress data generation within the detected customer premises equipment nodes using a smart amplifier radio frequency tray, wherein the smart amplifier radio frequency tray is connected between the customer premises equipment nodes and a network node that connects the customer premises equipment nodes to a cable modem termination system;

detecting, by the machine learning engine, identified ingress data generation locations generating ingress data exceeding a second predetermined level; and reducing ingress data generation from the detected identified locations.

2. The method of claim 1, wherein the machine learning engine detects customer premises equipment nodes generating ingress data above a first predetermined level and detects identified ingress generation locations generating ingress exceed a second predetermined level based on data clustering and data layering.

3. The method of claim 1, wherein the detection of locations that are generating excessive ingress is based on subgroup discovery and analytics (SCAN).

4. The method of claim 3, wherein the detection of locations that are generating excessive ingress is based on applying support vector machine (SVM) analysis on the SCAN results.

5. The method of claim 1, wherein the machine learning engine is trained by rules input to the machine learning engine and by capturing and analyzing data received from the customer premises equipment network.

6. The method of claim 5, wherein the machine learning engine is further trained by cable modem termination system data and by cable modem data.

7. The method of claim 1, wherein reducing ingress data generation comprises one or more of:

reducing a data speed of one or more of the detected identified ingress data generation locations;

transmitting self-repair signals to at least one of the detected identified ingress data generation locations; or transmitting detected identified ingress data generation location data to a service technician.

8. The method of claim 1, wherein the locations of the generation of ingress is determined based on the data collected from the smart amplifier radio frequency tray.

9. A system for ingress detection and localization within a customer premises equipment network, comprising:

a processing device;

a machine learning engine; and non-transitory computer readable data storage media storing instructions that, when executed by the processing device, cause the processing device to detect and localize ingress noise within a customer premises equipment network, the ingress detection and localization system operative to:

collect data associated with customer premises equipment activities within a customer premises network;

detect, with a machine learning engine, customer premises equipment nodes within the collected data that are generating ingress data above a first predetermined level;

identify locations of ingress data generation within the detected customer premises equipment nodes using a smart amplifier radio frequency tray, wherein the smart amplifier radio frequency tray is connected between the customer premises equipment nodes and a network node that connects the customer premises equipment nodes to a cable modem termination system;

detect, by the machine learning engine, identified ingress generation locations generating ingress data exceeding a second predetermined level; and reduce ingress data generation from the detected identified locations.

10. The system of claim 9, wherein the machine learning engine detects customer premises equipment nodes generating ingress data above a first predetermined level and detects identified ingress generation locations generating ingress exceed a second predetermined level based on data clustering and data layering.

11. The system of claim 9, wherein the detection of locations that are generating excessive ingress is based on subgroup discovery and analytics (SCAN).

12. The system of claim 11, wherein the detection of locations that are generating excessive ingress is based on applying support vector machine (SVM) analysis on the SCAN results.

13. The system of claim 9, wherein the machine learning engine is trained by rules input to the machine learning engine and by capturing and analyzing data received from the customer premises equipment network.

14. The system of claim 13, wherein the machine learning engine is further trained by cable modem termination system data and by cable modem data.

15. A non-transitory computer readable storage device including executable instructions for ingress detection and localization within a customer premises equipment network, which when executed by a processor, is operable to:

collect data associated with customer premises equipment activities within a customer premises equipment network;

detect, with a machine learning engine, customer premises equipment nodes within the collected data that are generating ingress data above a first predetermined level;

identify locations of ingress data generation within the detected customer premises equipment nodes using a smart amplifier radio frequency tray, wherein the smart amplifier radio frequency tray is connected between the customer premises equipment nodes and a network node that connects the customer premises equipment nodes to a cable modem termination system;

detect, by the machine learning engine, identified ingress generation locations generating ingress data exceeding a second predetermined level; and reduce ingress data generation from the detected identified locations.

16. The non-transitory computer readable storage device of claim 15, wherein the detection of locations that are generating excessive ingress is based on applying support vector machine (SVM) analysis on subgroup discovery and analytics (SCAN) results.

17. The non-transitory computer readable storage device of claim 15, wherein the machine learning engine is trained by rules input to the machine learning engine and by capturing and analyzing data received from the customer premises equipment network.

18. The non-transitory computer readable storage device of claim 17, wherein the machine learning engine is further trained by cable modem termination system data and by cable modem data.

19. The non-transitory computer readable storage device of claim 15, wherein the collected data includes three or more of:

command line interface data;

smart amplifier radio frequency tray data;

modem data;

node data;

rules;

frequency data;

upstream data;

downstream data;

sensor data; and customer premises equipment data.

20. The non-transitory computer readable storage device of claim 15, wherein the locations of the generation of ingress is determined based on the collected data from the smart amplifier radio frequency tray.

* * * * *